(No Model.) 3 Sheets—Sheet 1.

W. STOREY.
ATTACHMENT FOR MOWING MACHINES.

No. 515,802. Patented Mar. 6, 1894.

Witnesses
Geo. W. Young
John E. Wiles.

Inventor
S. Wendel Storey
By H. G. Underwood.
Attorney (No Model.) 3 Sheets—Sheet 2.
W. STOREY.
ATTACHMENT FOR MOWING MACHINES.
No. 515,802. Patented Mar. 6, 1894.
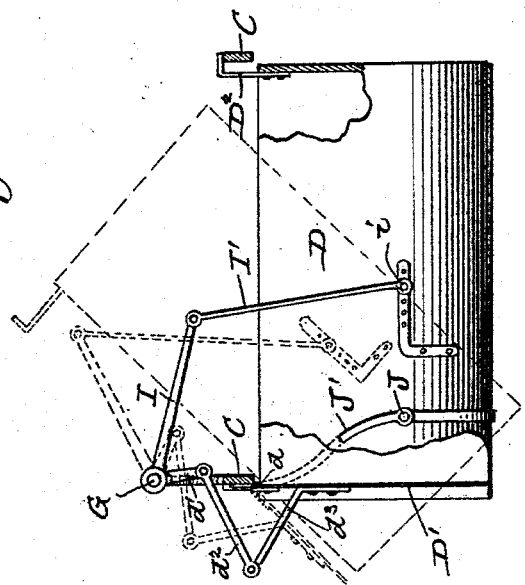
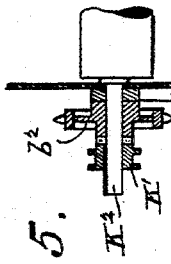
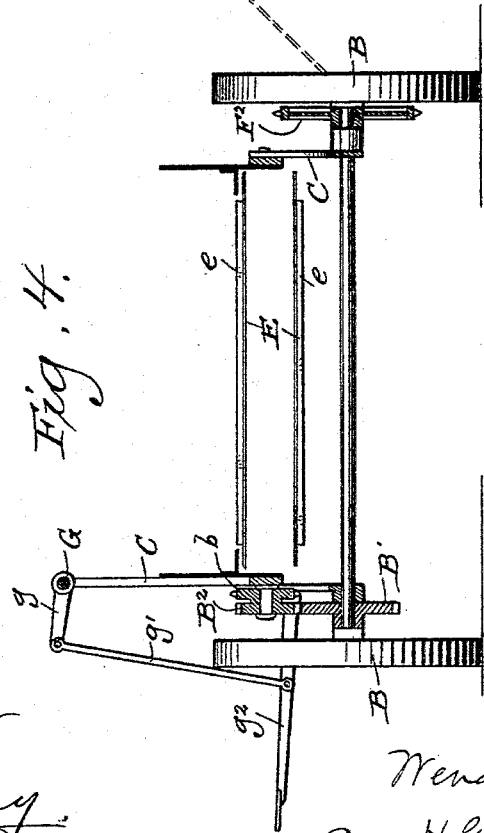
Witnesses
Geo. W. Young
John E. Wiles
Inventor
Wendel Storey
By H. G. Underwood
Attorney (No Model.) 3 Sheets—Sheet 3.
W. STOREY.
ATTACHMENT FOR MOWING MACHINES.
No. 515,802. Patented Mar. 6, 1894.
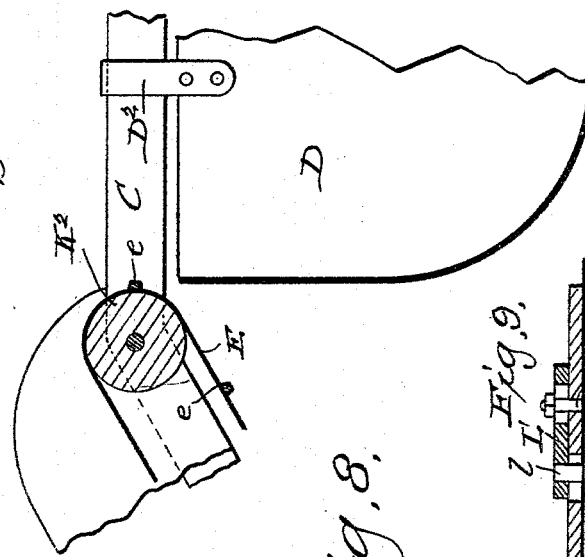
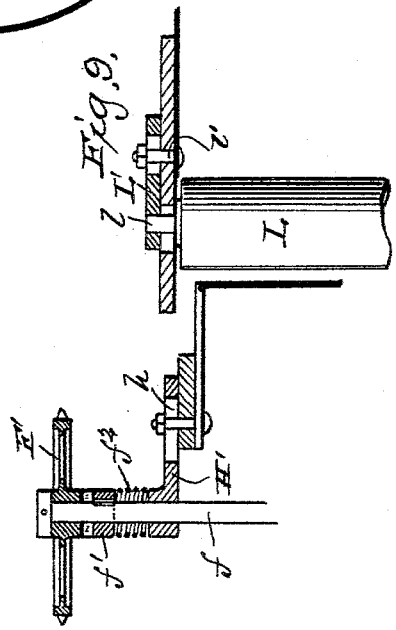
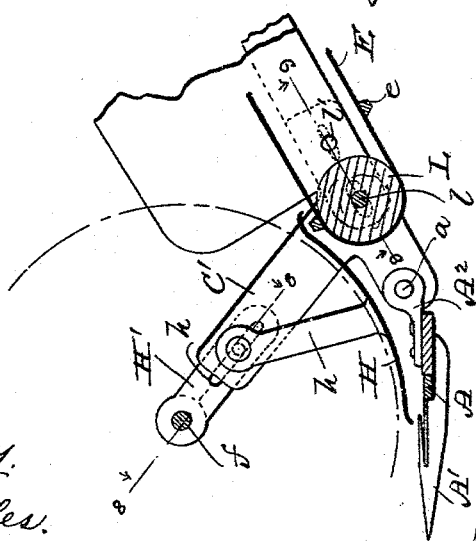
Witnesses
Geo. W. Young
John E. Wiles
Inventor
Wendel Storey
By H. G. Underwood
Attorney

UNITED STATES PATENT OFFICE.

WENDEL STOREY, OF GRAFTON, WISCONSIN.

ATTACHMENT FOR MOWING-MACHINES.

SPECIFICATION forming part of Letters Patent No. 515,802, dated March 6, 1894.

Application filed April 11, 1892. Serial No. 428,657. (No model.)

*To all whom it may concern:*

Be it known that I, WENDEL STOREY, a citizen of the United States, and a resident of Grafton, in the county of Ozaukee, and in the State of Wisconsin, have invented certain new and useful Improvements in Attachments for Mowing-Machines; and I do hereby declare that the following is a full, clear, and exact description thereof.

My invention relates to new and useful improvements in attachments for mowing machines, and relates more particularly to a device adapted for attachment to the finger bar of a mowing machine and so constructed as to enable it to operate to gather up the materials (such as clover or short grasses) as they are cut by the cutter bar, and to pass the same into a suitable receiver from which they may be discharged from time to time at the will of the operator.

Figure 1:
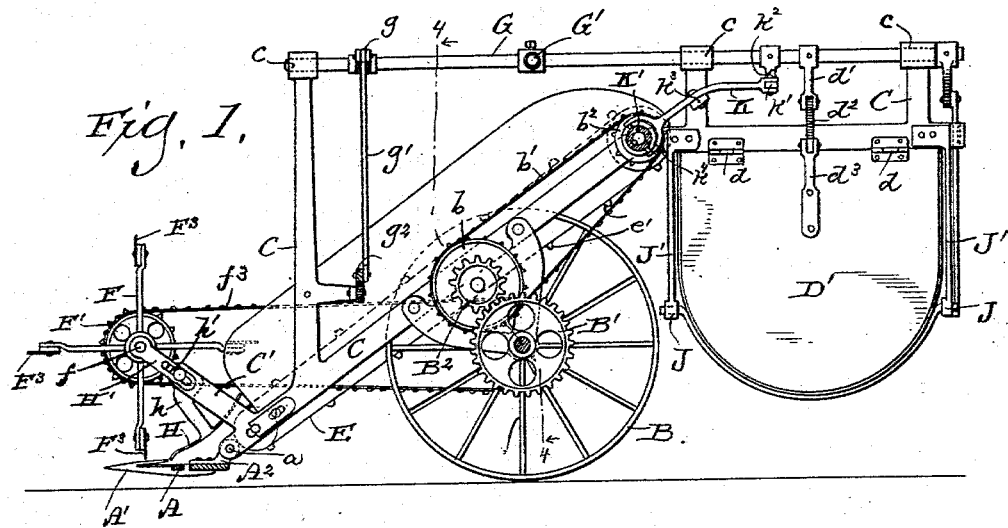
Figure 2:
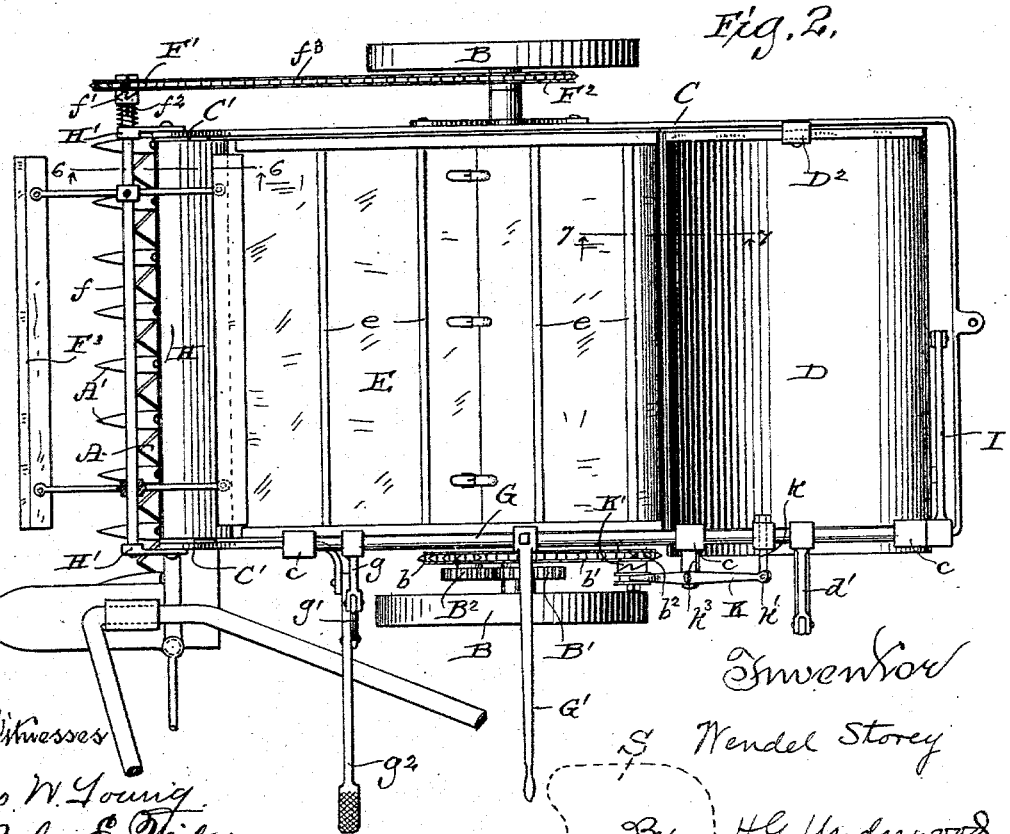

In the accompanying drawings illustrating my invention: Figure 1 is a side elevation of a device constructed in accordance with my invention. Fig. 2 is a top plan view of the same. Fig. 3 is a rear elevation of the receptacle and the dumping apparatus. Fig. 4, is a vertical cross sectional view of the device, said section being taken on line 4—4 of Fig. 1. Fig. 5, is a detail view, partly in section of one of the parts. Fig. 6, is a vertical sectional view of a portion of the device upon line 6—6 of Fig. 2. Fig. 7, is a similar view of another portion of the device taken on line 7—7 of Fig. 2. Fig. 8, is a detail sectional view taken on line 8—8 of Fig. 6. Fig. 9, is a similar view taken on line 9—9 of Fig. 6.

In said drawings:—A represents the cutter bar of an ordinary mowing machine arranged to run in the usual guards A' secured to the finger bar.

B B represent the carrying and driving wheels of my improved attachment, and C the frame of the same. The forward end of the frame C is arranged to be connected with the finger bar by means of suitable plates $A^2$ $A^2$ which are secured to said finger bar and provided with ears $a$ $a$ to which the forward ends of the side portions of the frame C are pivotally connected as shown in Figs. 1 and 6 of the drawings.

At the rear end of the frame C is located a receptacle D for the material cut by the cutter bar A, and a conveyer E, provided with cross bars or slats $e$ $e$, is arranged to receive the said material as it is cut and to carry the same rearwardly and discharge it into said receptacle D. A reel F is arranged to revolve above the cutter bar and to throw the material cut by the cutter bar toward the rear and direct the same with certainty upon the conveyer.

A rock shaft G is journaled in suitable bearings $c$ $c$ at the upper part of the frame C and extends lengthwise along one side of the machine and is operatively engaged with mechanism for tilting the receptacle D to discharge the contents thereof upon the ground, and also with suitable means for stopping the motion of the conveyer at such times. A handle G' is engaged with this rock shaft G and is adapted to be operated by hand to rock said shaft to effect the said movements of these parts. A second arm $g$ extends from the rock shaft G and is engaged at its outer end, with a link $g'$ with which is operatively engaged a foot lever $g^2$ pivotally connected at one of its ends with the frame C. The conveyer E is actuated from one of the wheels B, by means of a gear B' keyed to the axle of said wheel, and meshing with a pinion $B^2$, upon the shaft of which is secured a sprocket wheel $b$ over which a sprocket chain $b'$ is trained said chain being also trained over a sprocket wheel $b^2$ upon the axis of one of the rollers which carry the conveyer E.

Adjacent to the cutter bar A is suspended a guard plate H which is conveniently supported upon arms $h$ which are pivotally engaged with standards C' C', which project upwardly from the forward ends of the side pieces of the frame C. Arms H' H' are also adjustably engaged with said standards and arranged to support the opposite ends of the shaft $f$ of the reel F. Upon one end of said shaft $f$ is provided a sprocket gear F' loosely journaled thereon and provided with suitable notches upon its hub adapted to engage with correspondingly shaped notches upon a collar $f'$ splined onto said shaft and normally pressed outward into engagement with the notches in said hub by means of a spirally coiled spring $f^2$ arranged upon the shaft $f$, the whole forming a well known form of clutch by means of which a forward rotation of the wheel F' will cause the reel to rotate, while permitting the said wheel to rotate in the opposite direction without rotation of said reel. A sprocket wheel $F^2$ is engaged with the hub of the wheel B upon this side of the machine and a sprocket chain $f^3$ is trained over the two sprocket wheels F' and F², so as to transmit motion from the said wheel B to the reel. The cross bars or sweeps of the reel are preferably provided with strips of flexible material $F^3$ $F^3$ which are arranged to project slightly beyond the outer edges of said bars, and the reel is preferably adjusted so as to cause the flexible strips $F^3$ $F^3$ to rub against the upper surfaces of the guard fingers A' and the plate H so as to wipe off therefrom any of the cut material that would be liable to adhere to the same, and also to insure its being all delivered upon the conveyer. The guard plate H is arranged to extend over the open space between the cutter bar and the forward end of the conveyer, so as to prevent any of the cut material from dropping through said open space to the ground.

The receiver D at the rear of the machine is pivotally supported as at J J, between the lower ends of suitable hanger arms J' J' which project downwardly from the rear part of the frame C, and an arm I is secured to the rock shaft G and operatively engaged at its outer end with a link I' engaged as at $i$ with the receiver D and adapted by a vibration of said rock shaft, to swing said receptacle D about its pivotal support, so as to enable the contents thereof to be readily discharged from its end. A depending cover or flap D' is arranged to normally close the discharge end of the receiver D, said cover or flap being hinged as at $d$ $d$ to one of the side pieces of the frame and adapted to swing outwardly. An arm $d'$ is provided upon the rock shaft G and engaged at its free end with a link $d^2$ which is in turn connected with an angular arm $d^3$ upon the cover or flap D', the arrangement being such that as the said shaft is rocked into position to swing the receiver D into position to discharge its contents, the said cover or flap D' will be swung open and into the position indicated in Fig. 3, by dotted lines. Upon the free end of the receiver D, is provided an angular bracket D² arranged to engage with the side piece of the frame C as shown, when the said receiver is in its normal position, this bracket serving as a support for the free end of a receiver. A lever K is pivotally engaged with a link $k$ as at $k'$, said link being engaged at its other end with an arm $k^2$ which extends from the rock shaft G, the said lever K being pivoted to a suitable projecting bracket $k^3$ upon the frame and bifurcated at its free end, as at $k^4$, the furcations thereof being arranged to engage with a sliding clutch member K' splined upon the shaft of the conveyer actuating roller K², said sliding clutch member being provided with notches and adapted for engagement with corresponding notches in the hub of the sprocket wheel $b^2$ which drives the conveyer, this wheel being loose upon said shaft. The arrangement of these parts is such, that when the shaft G is rocked to discharge the contents of the receiver D, the lever K will be actuated to throw the clutch member K' out of engagement with the wheel $b^2$ so as to stop the movement of the conveyer while the said receiver is in its inclined position and thereby preventing any of the cut material from being discharged from the conveyer below the said receiver upon the ground. When the reverse movement of the rock shaft is effected to return the receiver to its normal position, the lever K will obviously be vibrated in the opposite direction from that just described, so as to return the clutch member K' into engagement with the wheel $b^2$ and cause the conveyer to recommence its movement. In the meantime, while the movements of the said rock shaft and connections are being effected to dump the contents of the receiver D upon the ground, the reel continues to operate to throw the material as it is cut, rearwardly upon the conveyer, so that when the same is again started as above described all of the material cut while the conveyer has remained stationary, will be carried backward and discharged into the receiver D.

As illustrated in Fig. 2, of the drawings, the foot lever $g^2$ and the hand lever G' are both arranged within convenient reach of the driver's seat shown in said figure by dotted lines at S, so as to be readily operated by the hand or foot of the driver to discharge the contents of the receiver D.

I prefer to arrange the lower roller L of the conveyer so as to be adjustable within the frame C, with respect to the other roller K², and to this end, I engage the opposite ends of the shaft $l$ of said roller, within suitable journal bearings in plates L' L' adjustably engaged with opposite sides of the frame, and held in their adjusted positions by means of suitable bolts $l'$ $l'$. By this construction, I am enabled to adjust the roller L with respect to the roller K so as to give any desired tension to the conveyer. By the described construction of the reel actuating mechanism, it will be seen that, when the machine is being turned about or moved backward so as to cause a backward rotation of the wheel B which carries the reel driving sprocket gear F², the clutch upon the shaft of the reel will operate to permit of a free backward rotation of the gear F' without causing a backward rotation of the reel.

It will be observed by reference to the drawings, that the relative sizes of the gears F² and F' are such as to produce a comparatively rapid rotation of the reel F with a comparatively slow rate of rotation of the wheel F² and wheel B. Similarly, the relative sizes of the conveyer actuating gears B', B², $b$ and $b^2$ are such as to produce a high rate of travel of the conveyer with a comparatively slow speed of the wheels B and B'.

By my improved form of construction, I am enabled to successfully and economically gather clover or other short length grasses which cannot be gathered by machines of ordinary construction, and to discharge said cut material from the receiver into piles at the side of the line of travel of the machine where the same will remain undisturbed by the subsequent operations of the machine, and farmers are therefore enabled by the use of my improved apparatus to gather valuable crops of clover or other short growth grasses which ordinarily are not cut at all on account of the difficulty of handling.

My improved apparatus may be readily connected with the finger bar of any of the ordinary mowing machines, and used as an adjunct thereto, it being only necessary to make the connections between the sides of the frame and the finger bar, in the manner before described.

I would have it understood that various modifications may be made in the details of construction and the arrangement of the several parts of my improved device without departure from my invention, and I therefore do not desire to limit myself to the exact form of construction and arrangement of parts shown in the drawings and herein described.

Having thus described my invention, what I claim as new, and desire to secure by Letters Patent of the United States, is—

1. An attachment for mowing machines comprising a suitable frame and carrying wheels, means for connecting the said frame with the cutter bar frame of a mowing machine, a longitudinally moving conveyer adapted to receive and automatically discharge into a dumping receiver the material cut by the cutter bar, a receiver at the rear of the said frame provided with an outwardly swinging hinged flap at one end for the material discharged from the conveyer, and means for outwardly raising said flap and tilting said receiver transversely to the line of travel of said machine and without detachment of the receiver, to discharge its load, substantially as set forth.

2. An attachment for mowing machines, comprising a suitable frame adapted for engagement with the cutter-bar-frame of a mowing machine and mounted upon suitable carrying wheels, a dumping receiver located at the rear of said frame, and provided with an outwardly swinging hinged flap at one end, a longitudinally moving conveyer extending upwardly from a point just in the rear of the cutter bar to a point just in front of, and level with the top of, said dumping receiver, and arranged to receive material cut by the cutter bar and arranged to discharge the same into the said receiver, and a reel located above the forward end of the device and adapted to throw said material rearwardly upon the conveyer as it is cut by the cutter bar, substantially as set forth.

3. An attachment for mowing machines comprising a suitable frame adapted for engagement with the cutter-bar-frame and mounted upon suitable carrying wheels, a receiver located at the rear of said frame and provided with an outwardly swinging hinged flap at one end, means for outwardly raising said flap, and laterally tilting said receiver to discharge its contents upon the ground, a conveyer adapted to receive the material cut by the cutter bar and to discharge the same into said receiver and extending continuously between the rear edge of the finger-bar, and the front edge of the tilting receiver, means for stopping the motion of said conveyer when the receiver is tilted, a reel for directing the material cut by the cutter bar, rearwardly upon the conveyer, and a guard plate arranged above the open space between the cutter bar and the forward end of the conveyer, substantially as set forth.

4. An attachment for mowing machines, comprising a suitable frame adapted for engagement with the cutter-bar-frame of a mowing machine, and mounted upon suitable carrying wheels, a reel operatively geared to the axle of said carrying wheels a receiver pivotally suspended from the rear end of said frame, and provided with an outwardly swinging hinged flap at one end a conveyer adapted to receive the material cut by the cutter bar and to deliver the same into said receiver, a rock shaft journaled upon the frame, means for rocking said shaft, and operative connections between said receiver and the conveyer actuating mechanism for simultaneously raising said hinged flap outwardly tilting said receiver to discharge its load and throwing said conveyer actuating mechanism out of operation without stopping the operation of the cutter-bar and reel substantially as set forth.

5. An attachment for mowing machines, comprising a suitable frame adapted for engagement with the cutter-bar-frame of a mowing machine, a receiver pivotally suspended from the rear end of said frame, a pendulous cover or flap, hinged to the frame and adapted to normally close the discharge end of said receiver, a conveyer adapted to receive material cut by the cutter bar and to discharge the same into said receiver, a rock shaft journaled in suitable bearings upon the frame, means for rocking said shaft, and operative connections between said rock shaft and the receiver, the pendulous cover or flap, and the conveyer actuating mechanism, for simultaneously tilting said receiver to discharge its load, vibrating said pendulous cover or flap to free the discharge end of said receiver and throwing said conveyer actuating mechanism out of operation, substantially as set forth.

In testimony that I claim the foregoing I have hereunto set my hand, at Grafton, in the county of Ozaukee and State of Wisconsin, in the presence of two witnesses.

WENDEL STOREY.

Witnesses:
G. S. McBEAN,
WILLIAM WEBER.